United States Patent Office 3,214,869
Patented Nov. 2, 1965

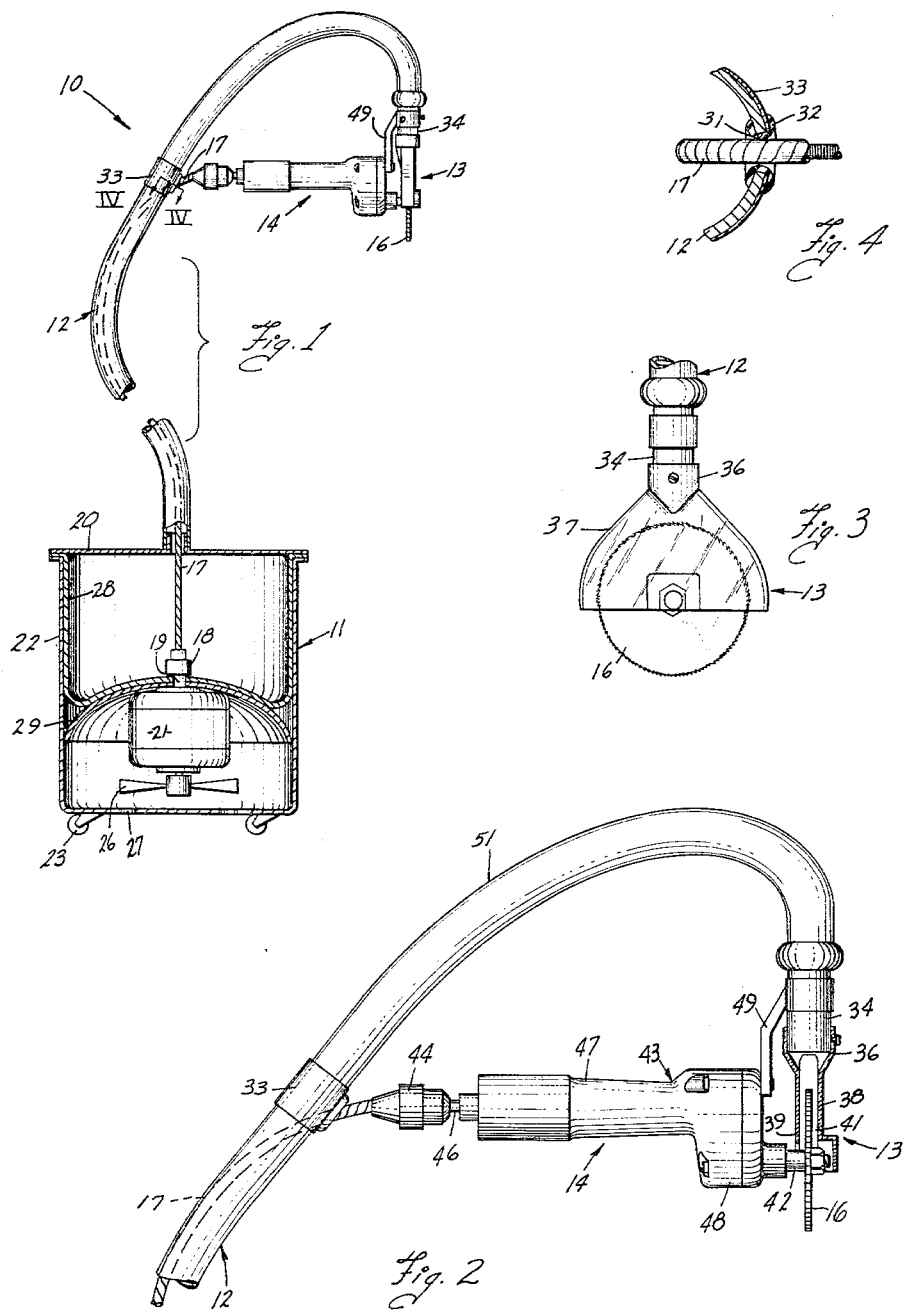

3,214,869
COMBINED ABRADING AND VACUUM DEVICE
Homer H. Stryker, Kalamazoo, Mich., assignor to Stryker Corporation, a corporation of Michigan
Filed Sept. 12, 1963, Ser. No. 308,424
3 Claims. (Cl. 51—273)

This application relates to a combined surgical cutting or abrading tool and a vacuum device for removing the waste particles produced by the tool during a cutting or abrading operation.

There are a number of surgical and related operations in which a considerable amount of very small particles of plaster, bone or flesh is produced. Examples of such operations are cast cutting and removal, bone cutting and dermatome operations after skin grafting. It is necessary for a variety of well understood reasons to remove such particles substantially as soon as they become present. Consequently, it has been customary to use various forms of vacuum devices mounted on or in association with the cutting or abrading tool, hereinafter referred to simply as the cutting tool, to remove such particles and forward them to a collector for subsequent disposal.

Heretofore it has been considered essential to drive the vacuum source and the cutting tool separately so that separate motors, housings and related equipment had to be used, all of which occupied considerable space and represented considerable capital investment. I have discovered, unexpectedly in view of the prior practices in this field, that it is possible to use a single power source, such as an electric motor, to drive both the vacuum device and the cutting tool, and the present invention is directed to structure for carrying out this concept. Due to the separate drives for the vacuum device and the cutting tool on existing structures at least two separate lines or conduits have been required. That is, for example, the vacuum device has included a conduit for moving the particles into a collector and the cutting tool has been connected by a flexible cable to an electric motor which has been independent of the vacuum device. This arrangement has been cumbersome to handle, inconvenient to operate and has created problems of sanitation.

Accordingly, it is an object of this invention to provide a combined apparatus including a vacuum device and a cutting tool which are driven from a single power source.

It is a further object of this invention to provide a combined apparatus, as aforesaid, which makes use of a standard vacuum source and cutting tool and which provides a special and relatively simple connection between the power source for the vacuum device and the drive shaft for the cutting tool whereby the separate power source heretofore required for the cutting or abrading tool is eliminated in a simple and inexpensive manner.

It is a further object of this invention to provide a combined apparatus, as aforesaid, in which the operation of the individual components remains substantially the same as in previous practice so that the same techniques can be used but with added facility and ease because of the compact and convenient construction of the combined apparatus.

It is a further object of this invention to provide a combined apparatus, as aforesaid, which is substantially less expensive than the total cost of the two separate units heretofore used, but which will perform in an equally effective manner.

Other objects and advantages of this invention will become apparent to persons acquainted with equipment of this type upon reading the following description and inspecting the accompanying drawings.

In the drawings:

FIGURE 1 is a schematic side view, partially in central section and partially broken away, of the combined apparatus of the invention.

FIGURE 2 is an enlarged fragment of FIGURE 1, partially in central section, showing a cutting tool associated with the vacuum head fixture.

FIGURE 3 is a front elevational view of a fragment of FIGURE 2.

FIGURE 4 is a sectional view taken on the line IV—IV of FIGURE 1.

General Description

According to the invention, there is provided a combined apparatus comprised of a cutting or abrading device and a vacuum device. The vacuum device includes a container having a rotatable impeller therein which is driven by an electric motor. An elongated flexible hose is connected at one end to the container and a vacuum head is mounted on its other end. A tool is fixedly associated with the vacuum head, such as being secured thereto by a bracket, and the tool and vacuum head are so positioned with respect to each other that particles created by operation of the tool are entrained in the air passing into the vacuum head. The tool is mounted on a housing which contains a structure for effecting operation of the tool. The drive shaft of the tool extends out of the housing and is connected by a coupling to an elongated, flexible shaft. The flexible shaft, which is connected at one end to the motor shaft of the vacuum device, extends lengthwise within the hose and exits therefrom at a point near to the tool so that it can be conveniently connected to the drive shaft of the tool.

Detailed description

Referring to the attached drawings, the combined apparatus 10 (FIGURE 1) is comprised of a vacuum source 11 which is connected by a flexible, elongated hose 12 to a vacuum head 13 whereby a vacuum can be created in the region adjacent to said vacuum head. A cutting or abrading device 14 has a tool 16 disposed in or adjacent to the vacuum head so that particles created by operation of the tool are sucked into the vacuum head and thence forwarded through the hose 12 to the vacuum source 11. The tool 16 is driven by a flexible shaft 17, most of which is located within and extends along the hose 12. The flexible shaft 17 is connected by a coupling 18 to the shaft 19 of the motor 21 in the vacuum source 11.

The vacuum source 11 can be any of many commercially available types. One satisfactory device 11, which is schematically shown in FIGURE 1, comprises a canister type vacuum cleaner having a casing 22 supported by casters 23 for rolling along a floor. The hose 12 is mounted on the removable cover of the casing 22 so that air flows into the upper end of said casing. The motor 21 is mounted within the casing 22 in any convenient, conventional fashion. The motor 21 has a substantially vertically extending shaft 19 on the lower end of which is mounted an impeller 26 for drawing air through the hose 12 and discharging through suitable openings 27 in the bottom wall of the casing.

A disposable, air pervious bag 28 is disposed in the upper end of the casing and extends thereacross whereby particles entrained in the air stream flowing into the casing 22 through the hose 12 are filtered out and collected in the bag so that substantially clean air flows out of the casing through the openings 27. A further filter element 29 is permanently mounted in the casing 22 above the motor 21 to further filter the air passing therethrough. The upper end of the shaft 19 extends upwardly from the motor 21 through corresponding openings in the bag 28 and the filter element 29.

The flexible shaft 17 is releasably connected to the motor shaft 19 by a coupling 18 of any suitable type. Desirably, the coupling is of the snap lock type so that the flexible shaft can easily and conveniently be drivingly connected to the motor shaft 19 when the cover 20 is placed on the casing. However, other types of couplings, such as a screw threaded coupling, can be used if desired.

The flexible shaft 17 extends longitudinally through the hose 12 and it exits therefrom through a suitable opening 31 (FIGURE 4) in the wall of said hose. Suitable guide means, such as grommet 32, may be placed in the opening 31 to protect the hose and guide the flexible shaft. Further, the hose 12 may be reinforced adjacent the opening 31 in any suitable manner, such as by providing a reinforcing sleeve 33 around the hose.

The free end of the hose 12 has a metal tubular extension 34 (FIGURE 2) connected thereto. The vacuum head 13, which preferably is of one piece construction and is made of a transparent plastic material, such as methyl methacrylate, has a tubular mounting portion 36 which is sleeved on and affixed to the extension 34. The vacuum head 13 has a hood portion 37 which in this particular embodiment in plan view has the shape substantially of a segment of a circle (FIGURE 3). The hood portion 37 (FIGURE 2) has spaced apart front and rear walls 38 and 39 defining a central opening 41 in which the tool 16 is received. The tool 16 is here shown as being a bone cutting saw but it will be apparent that it could be a cast cutting saw, as shown in my Patent No. 2,427,580, or a dermatome. The vacuum pressure of the vacuum device may also be used to control the movement and handling of the skin being removed by the dermatome. Thus, it will be apparent that the shape of the vacuum head, particularly the hood portion 37 thereof, can be modified to cooperate with a wide variety of other surgical cutting or abrading tools.

The tool 16 is mounted on an output shaft 42 which extends from the housing 43 through an opening in the rear wall 39 of the hood portion 37. The flexible shaft 17 is connected through a suitable coupling 44 to the input shaft 46 of the tool 16. The input shaft 46 extends through the hand grip portion 47 of the housing 43 and thence into the enlarged drive box 48, which is connected to the extension 34 by a bracket 49. The drive box 48 contains suitable means of any convenient, conventional type whereby rotation of the input shaft 46 is translated into the desired motion of the output shaft 42. In the disclosed embodiment, where the tool 16 is a bone cutting saw, the drive box 48 houses gears for effecting rotation of the shaft 42 about its own axis. It is to be understood, however, that other drive mechanisms can be used, such as to effect, for example, oscillation of a cast cutting saw as disclosed in my patent No. 2,427,580.

The hose 12 is bent to form a curved portion 51 which extends between the point where the flexible shaft 17 exits therefrom and the metal extension 34. Since the flexible shaft 17 normally is relatively stiff, the hose 12 extends adjacent the opening 31 at as small an angle as possible with respect to the flexible shaft 17, usually at an angle of 30–45°, in order to minimize sharp bending of said shaft. The housing 43 extends directly between the opening 31 and the hood portion 37. The arcuate portion 51 of the hose, due to its resiliency and flexibility, can be deformed as needed in order to permit assembly with the parts which carry out the cutting or abrading operation.

*Operation*

While the operation of the apparatus 10 is believed to be obvious from the foregoing description, it will be briefly reviewed to insure a complete understanding of the invention.

When the motor 21 is energized, the tool 16 will be driven and simultaneously air will be drawn into the vacuum head 13 and thence will pass through the hose 12 into the casing 22 from whence it will be discharged after the entrained particles have been removed therefrom by passing through the wall of the bag 28 and the filter element 29. Thus, when the tool 16 is of the type for cutting a bone, a cast or flesh, the particles produced as the result of the cutting operation will be drawn into the vacuum head and transported into the casing 22 where they will be collected, primarily in the bag 28.

It will be observed that the placing of the tool 16 and the vacuum head 13 in close proximity will not interfere materially with the effective carrying out of the cutting operation and, at the same time, it will permit rapid and effective disposal of the particles produced by the cutting operation. Likewise, the driving of the tool 16 and the impeller 26 from the same motor 21 will make the apparatus 10 less expensive and more convenient than separate units, and it will not require any compromise in their essential characteristics. Since the hose 12 is flexible and yieldable, the tool 16 can be maneuvered in any appropriate fashion in order to carry out the cutting or abrading operation and the hose will bend and flex as necessary so that it will not interfere therewith. Moreover, only one element will extend from the operating head of the combined vacuum and cutting device to all outside connections.

Although a particular preferred embodiment of the invention has been disclosed herein above for illustrative purposes, it will be understood that variations or modifications of such structure, which come within the scope of the appended claims, are fully contemplated.

What is claimed is:

1. A combined abrading and vacuum device, comprising:
   a container having therewithin an electric motor and a rotatable impeller driven by said motor for drawing air into said container;
   an elongated, flexible hose connected at one end to said container and having a vacuum head mounted on its other end, said head having an elongated and narrow opening;
   an elongated, flexible shaft drivingly connected at one end thereof to said motor and extending therefrom into, and then lengthwise within, said hose and exiting therefrom at a point near to but spaced from said vacuum head;
   a housing extending from adjacent said point to adjacent said vacuum head and bracket means connecting said housing with said vacuum head, said housing being spaced from said hose and having a hand grip portion and having a tool support shaft projecting lengthwise from one end of said housing and transversely of the portion of said hose adjacent said other end thereof, said housing having a drive shaft projecting from the other end thereof, said drive shaft being connected to said tool support shaft for effecting operation thereof when said drive shaft is rotated;
   an abrading tool connected to and operated by said tool support shaft within said head, said tool having an abrading edge projecting through said narrow opening in said head; and
   coupling means connecting said flexible shaft to said drive shaft whereby said motor serves both to rotate said flexible shaft, thereby to operate said tool, and to effect rotation of said impeller, whereby air is removed through said hose into said container.

2. A combined abrading and vacuum device, comprising:
   a container having a removable cover;
   an elongated, flexible hose connected at one end to said cover for communication with said container and having a vacuum head mounted on its other end;
   an electric motor mounted within said container and having a double shaft extension;
   a rotatable impeller mounted upon one extension of said motor shaft and rotatable thereby for drawing air into said container through said hose;
   filter means including a disposable bag in said container for filtering out solid materials from the air stream flowing therethrough;

an elongated, flexible shaft drivingly connected at one end thereof to the other extension of said motor shaft by a releasable coupling, said flexible shaft extending from said coupling through said cover into, and then lengthwise within, said hose and exiting therefrom at a point near to, but spaced from, said vacuum head;

a housing extending from adjacent said point to adjacent said vacuum head and bracket means fixedly associating said housing with said vacuum head, said housing having a hand grip portion and having a tool support shaft projecting from one end of said housing and supporting a tool close to said vacuum head, said housing having a drive shaft projecting from the other end thereof, said drive shaft being connected to said tool support shaft for effecting operation of said tool when said drive shaft is driven; and coupling means connecting said flexible shaft to said drive shaft whereby said motor serves both to operate said tool and to effect rotation of said impeller.

3. A combined abrading and vacuum device, comprising:

a container having therewithin an electric motor and a rotatable impeller driven by said motor for drawing air into said container;

an elongated, flexible hose connected at one end to said container and having a vacuum head mounted on its other end;

an elongated, flexible shaft drivingly connected at one end thereof to said motor and extending therefrom into, and then lengthwise within, said hose and exiting therefrom at a point near to, but spaced from said vacuum head;

a housing extending from adjacent said point to adjacent said vacuum head and bracket means fixedly associating said housing with said vacuum head, said housing having a hand grip portion and having a tool support shaft projecting from one end of said housing and supporting a tool close to said vacuum head, said housing having a drive shaft projecting from the other end thereof, said drive shaft being connected to said tool support shaft for effecting operation of said tool when said drive shaft is driven, said hose being bent into a curved shape between said point and said vacuum head and said housing extending substantially directly between said point and said vacuum head; and coupling means connecting said flexible shaft to said drive shaft whereby said motor serves both to operate said tool and to effect rotation of said impeller.

References Cited by the Examiner

UNITED STATES PATENTS

| 1,093,049 | 4/14 | Hawley. | |
| 1,714,287 | 5/29 | Wilson | 15—327 |
| 1,810,336 | 6/31 | Bennington | 51—170 |
| 2,956,546 | 10/60 | Teters et al. | 51—273 X |
| 3,013,293 | 12/61 | Schottle | 15—328 X |
| 3,103,069 | 9/63 | Gary | 143—157 X |

FOREIGN PATENTS 456,984  11/36  Great Britain.

LESTER M. SWINGLE, *Primary Examiner.*